(12) United States Patent
Patel

(10) Patent No.: US 7,056,973 B2
(45) Date of Patent: *Jun. 6, 2006

(54) HIGH FLOW POLYPHENYLENE ETHER FORMULATIONS

(75) Inventor: Nirajkumar Patel, Delmar, NY (US)

(73) Assignee: General Electric, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/249,437

(22) Filed: Apr. 9, 2003

(65) Prior Publication Data

US 2003/0176543 A1    Sep. 18, 2003

Related U.S. Application Data

(63) Continuation of application No. 09/547,648, filed on Apr. 12, 2000, now Pat. No. 6,576,700.

(51) Int. Cl.
*C08L 71/12* (2006.01)

(52) U.S. Cl. ............... 524/508; 524/115; 524/125; 524/127; 524/139; 524/141; 524/504; 524/505; 524/538; 524/539; 524/540; 525/390; 525/397; 525/132; 525/133

(58) Field of Classification Search ............ 525/390, 525/397, 132, 133; 524/115, 125, 127, 139, 524/141, 504, 505, 508, 538, 539, 540
See application file for complete search history.

(56) References Cited

U.S. PATENT DOCUMENTS

| | | |
|---|---|---|
| 2,933,480 A | 4/1960 | Gresham |
| 3,093,621 A | 6/1963 | Gladding |
| 3,211,709 A | 10/1965 | Adamek et al. |
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,646,168 A | 2/1972 | Barrett |
| 3,790,519 A | 2/1974 | Wahlborg |
| 3,884,993 A | 5/1975 | Gros |
| 3,894,999 A | 7/1975 | Boozer et al. |
| 3,914,266 A | 10/1975 | Hay |
| 4,028,341 A | 6/1977 | Hay |
| 4,059,654 A | 11/1977 | Von Bodungen et al. |
| 4,097,550 A | 6/1978 | Haaf et al. |
| 4,154,712 A | 5/1979 | Lee, Jr. |
| 4,166,055 A | 8/1979 | Lee, Jr. |
| 4,584,334 A | 4/1986 | Lee, Jr. et al. |
| 4,692,482 A | 9/1987 | Lohrengel |
| 4,806,297 A | 2/1989 | Brown et al. |
| 4,806,602 A | 2/1989 | White et al. |
| 4,816,510 A | 3/1989 | Yates, III |
| 4,935,472 A | 6/1990 | Brown et al. |
| 5,019,616 A | 5/1991 | Avakian |
| 5,081,185 A | 1/1992 | Haaf et al. |
| 5,089,566 A | 2/1992 | Brown et al. |
| 5,204,410 A | 4/1993 | Baneviius et al. |
| 5,231,146 A | 7/1993 | Brown et al. |
| 5,237,005 A | 8/1993 | Yates, III |
| 5,256,250 A | 10/1993 | Pelzer |
| 5,258,455 A | 11/1993 | Laughner et al. |
| 5,290,881 A | 3/1994 | Dekkers |
| 5,294,654 A | 3/1994 | Hellstern-Burell |
| 5,376,724 A | 12/1994 | Bailly et al. |
| 5,419,810 A | 5/1995 | Van Der Piepen et al. |
| 5,461,096 A | 10/1995 | Bopp et al. |
| 5,859,130 A | 1/1999 | Gianchandai et al. |
| 5,880,221 A | 3/1999 | Liska |
| 5,916,970 A | 6/1999 | Lee, Jr. et al. |
| 5,981,656 A | 11/1999 | McGaughan et al. |
| 6,211,327 B1 | 4/2001 | Braat |

FOREIGN PATENT DOCUMENTS

| | | |
|---|---|---|
| EP | 0363578 | 4/1990 |
| EP | 0401690 | 12/1990 |

OTHER PUBLICATIONS

Chapter 3 of Organic Polymer Chemistry, 2nd Edition, K.G. Saunders, Chapman and Hall, 1988.
JP 11012354 Publication Date Jan. 19, 1999 (Abstract Only).

*Primary Examiner*—Jeffrey B. Robertson

(57) ABSTRACT

A high flow polyphenylene ether resin composition comprises a blend of at least two polyphenylene ether resins, a first resin having an intrinsic viscosity of at least 0.3 dl/g, and a second resin having an intrinsic viscosity of less than 0.17 dl/g and preferably having a particle size of at least about 100 μm. Fiber reinforced and flame retarded compositions exhibit high HDT values.

24 Claims, No Drawings

HIGH FLOW POLYPHENYLENE ETHER FORMULATIONS

CROSS REFERENCE TO RELATED APPLICATIONS

This application is a continuation of U.S. application Ser. No. 09/547,648, filed on Apr. 12, 2000 now U.S. Pat. No. 6,576,700, which is incorporated by reference herein.

BACKGROUND OF THE INVENTION

This disclosure relates to high flow polyphenylene ether formulations with improved properties.

Polyphenylene ether resins (PPE) are an extremely useful class of high performance engineering thermoplastics by reason of their hydrolytic stability, high dimensional stability, toughness, heat resistance and dielectric properties. They also exhibit high glass transition temperature values, typically in the range of 150° to 210° C., and good mechanical performance. This unique combination of properties renders polyphenylene ether based formulations suitable for a broad range of applications which are well known in the art. One example is injection molded products which are used for high heat applications. Polyphenylene ether polymers typically have relatively high molecular weights and possess high melt viscosity with intrinsic viscosity values typically greater than about 0.3 dl/g, as measured in chloroform at 25° C.

One area in which polyphenylene ether based compositions have required an improvement is melt flow capability, i.e. the ability to flow freely at elevated temperatures during various processing stages such as extrusion and molding. Poor melt flow can impact the size and type of part which can be prepared with the composition. In U.S. Pat. No. 4,154,712 to G. Lee, Jr. teaches that processability can be improved by decreasing the molecular weight of the polyphenylene ether polymers; however, lower molecular weight sometimes adversely affects other properties such as impact strength. To aid processing, polyphenylene ether resins are often prepared with flow promoters such as polystyrene, high impact polystyrene, saturated polyalicyclic resins and terpene phenol to impart high flow to the resulting composition. Polystyrene, terpene phenol and other such flow promoters reduce the heat deflection temperature (HDT) of the product and typically increase the flammability of the PPE resin, as measured under UL94 standard protocol.

Polyphenylene ether resins are often flame retarded with phosphorous containing organic compounds such as resorcinol diphosphate, Bisphenol-A diphosphate and tetraxylyl piperazine diphosphoramide to comply with Eco-label guidelines. The fire retardant grades of polyphenylene ether, particularly those rated UL94 V0, tend to be formulated using large amounts of flame retardant additives. The addition of large amounts of these phosphorous containing organic compounds reduces the heat deflection temperature (HDT) of the formulation even further.

Efforts to improve the flow characteristics of PPE resins with minimal or no loss of HDT values and impact properties have been made. For example, U.S. Pat. No. 5,376,724 to Bailey et al. discloses polyphenylene ether compositions which contain a resinous additive that improves flow with only minor reductions in HDT values and impact strength. The resinous additive is said to be comprised of vinyl aromatic monomers such as styrene monomers or a hydrocarbon compound containing at least 35 wt % aromatic units.

In addition, U.S. Pat. No. 5,081,185 to Haaf et al. describes compositions comprising a blend of two or more polyphenylene ether resins with one resin having high intrinsic viscosity values of at least about 0.38 dl/g and the other having low intrinsic viscosity values of no greater than 0.33 dl/g. The blend of the two PPE resins exhibits higher melt flow with no substantial decrease in heat deflection temperature (HDT) when compared to the high intrinsic viscosity PPE resin of the blend. Haaf et al. provides no special means for isolating low I.V. PPE resins from a reaction solution. In conventional isolation techniques, the PPE reaction solution, typically in toluene, is added to a non-solvent, such as methanol, to precipitate the PPE resin product. These non-solvent precipitation techniques provide very fine particles when applied to low I.V. PPE resins. These fine particles have very low bulk densities and are difficult to feed into extruders and other processing equipment. Consequently, the compositions taught by Haaf have limited commercial utility due to poor compounding throughputs and often erratic operation. Fine particles are also formed when isolating ultra-low viscosity PPE resins, e.g., PPE having an I.V. of less than about 0.27 dl/gm as measured in chloroform at 25° C., from solution by precipitation with a non-solvent.

It is desirable to provide a high flow PPE resin composition with improved flame retardance as well as improved HDT values and impact properties. Additionally it is desirable to develop improved methods to manufacture such compositions.

SUMMARY OF THE INVENTION

Disclosed herein are blends of polyphenylene ether resins which comprise a Component A and a Component B. Component A is a polyphenylene ether resin preferably having an intrinsic viscosity of at least about 0.3 dl/g, most often in the range of about 0.4–0.6 dl/g, as measured in chloroform at 25° C. This polyphenylene ether resin can comprise one or more different polyphenylene ether polymers. Component B is an ultra low viscosity polyphenylene ether resin having an intrinsic viscosity of no greater than about 0.25 dl/g, preferably no greater than about 0.17 dl/g, as measured in chloroform at 25° C. This resin can also comprise one or more different polyphenylene ether polymers.

DETAILED DESCRIPTION

Disclosed herein are blends of polyphenylene ether resins which comprise a Component A and a Component B. Component A is a polyphenylene ether resin preferably having an intrinsic viscosity of at least about 0.3 dl/g, most often in the range of about 0.4–0.6 dl/g, as measured in chloroform at 25° C. This polyphenylene ether resin can comprise one or more different polyphenylene ether polymers. Component B is an ultra low viscosity polyphenylene ether resin having an intrinsic viscosity of no greater than about 0.25 dl/g, preferably no greater than about 0.17 dl/g, as measured in chloroform at 25° C. This resin can also comprise one or more different polyphenylene ether polymers. It has been discovered that improvements in the flow properties of compositions containing polyphenylene ether resins can be obtained with smaller decreases in HDT values and flammability when ultra low viscosity polyphenylene ether resins are added instead of conventional flow modifying additives.

The polyphenylene ether polymers employed in Components A and B of the PPE blends of the present invention are known polymers comprising a plurality of aryloxy repeating units preferably with repeating units of Formula I

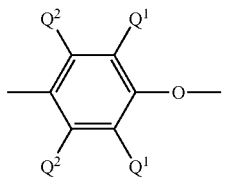
(I)

wherein in each of said units independently, each $Q^1$ is independently halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula I, aminoalkyl, hydrocarbonoxy or halohydrocarbonoxy wherein at least two carbon atoms separate the halogen and oxygen atoms and at least two carbon atoms separate the halogen atoms and the phenyl nucleus of Formula I.

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula I, hydrocarbonoxy groups or halohydrocarbonoxy groups wherein at least two carbon atoms separate the halogen and oxygen atoms and at least two carbon atoms separate the halogen atoms from the phenyl nucleus of Formula I. $Q^1$ and $Q^2$ suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes unsubstituted polyphenylene ether polymers, substituted polyphenylene ether polymers (wherein the aromatic ring is substituted), polyphenylene ether copolymers and blends thereof. Also included are polyphenylene ether polymers containing moieties prepared by grafting onto the polyphenylene ether in a known manner such materials as vinyl monomers or polymers such as polystyrenes and elastomers, as described in U.S. Pat. No. 5,089,566 issued to Sterling Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

The polyphenylene ether polymers used in Components A and B of the PPE blends of this invention may also have various end groups such as amino alkyl containing end groups and 4-hydroxy biphenyl end groups, typically incorporated during synthesis by the oxidative coupling reaction. The polyphenylene ether polymers may be functionalized or "capped" with end groups which add further reactivity to the polymer and in some instances provide additional compatibility with other polymer systems which may be used in conjunction with the polyphenylene ether polymers to produce an alloy or blend. For instance, the polyphenylene ether polymer may be functionalized with an epoxy end group, a phosphate end group or an ortho ester end group by reacting a functionalizing agent such as 2-chloro-4(2-diethylphosphato epoxy)6-(2,4,6-trimethyl-phenoxy)-1,3,5-trizene, with one of the end groups of the polyphenylene ether polymer, i.e., one of the terminal OH groups.

It will be apparent to those skilled in the art from the foregoing that the contemplated polyphenylene ether polymers include all of those presently known, irrespective of the variations in structural units.

Specific polyphenylene ether polymers useful in Components A and B of the PPE blends of the present invention include, but are not limited to, poly(2,6-dimethyl-1,4-phenylene ether); poly(2,3,6-trimethyl-1,4-phenylene) ether; poly (2,6-diethyl-1,4-phenylene) ether; poly(2-methyl-6-propyl-1,4-phenylene) ether; poly(2,6-dipropyl-1,4-phenylene) ether; poly(2-ethyl-6-propyl-1,4-phenylene) ether; poly(2,6-dilauryl-1,4-phenylene) ether; poly(2,6-diphenyl-1,4-phenylene) ether; poly(2,6-dimethoxy-1,4 phenylene) ether; poly(2,6-diethoxy-1,4-phenylene)ether; poly(2-methoxy-6-ethoxy-1,4-phenylene) ether; poly(2-ethyl-6-stearyloxy-1,4-phenylene)ether; poly(2,6-dichloro-1,4-phenylene) ether; poly (2-methyl-6-phenyl-1,4-phenylene) ether; poly (2-ethoxy-1,4-phenylene) ether; poly(2-chloro-1,4-phenylene) ether; poly(2,6-dibromo-1,4-phenylene) ether; poly (3-bromo-2,6-dimethyl-1,4-phenylene) ether; mixtures thereof, and the like.

Suitable copolymers include random copolymers containing 2,6-dimethyl-1,4-phenylene ether units and 2,3,6-trimethyl-1,4-phenylene ether units.

The polyphenylene ether resins employed as Component A within the PPE resin bends of this invention have an intrinsic viscosity greater than about 0.30 dl/g, as measured in chloroform at 25° C. These polymers generally have more than 50 repeating units of Formula I above and a number average molecular weight within the range of about 3,000 to 40,000 and a weight average molecular weight in the range of 20,000 to 80,000, as determined by gel permeation chromatography. The polyphenylene ether resins employed as Component B within the PPE resin blends according to this invention have an intrinsic viscosity of less than 0.25 dl/g, preferably 0.17 dl/g or less, as measured in chloroform at 25° C. As the upper limit of this range decreases to 0.15 dl/g, 0.14 dl/g, 0.13 dl/g, 0.12 dl/g, 0.11 dl/g, 0.10 dl/g and 0.09 dl/g, the PPE resins defined still find use as flow modifiers.

The polyphenylene ether polymers suitable for use in this invention may be prepared by any number of processes known in the art from corresponding phenols or reactive derivatives thereof. Polyphenylene ether resins are typically prepared by the oxidative coupling of at least one monohydroxy aromatic compound such as 2,6-xylenol or 2,3,6-trimethylphenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride-trimethylamine. Catalyst systems which contain manganese compounds are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride- and manganese chloride-sodium methylate. Suitable cobalt type catalyst systems contain cobalt salts and an amine.

Examples of catalyst systems and methods for preparing polyphenylether resins are set forth in U.S. Pat. Nos. 3,306,874, 3,306,875, 3,914,266 and 4,028,341 (Hay), U.S. Pat. Nos. 3,257,357 and 3,257,358 (Stamatoff), U.S. Pat. Nos. 4,935,472 and 4,806,297 (S. B. Brown et al.) and U.S. Pat. No. 4,806,602 (White et al.).

In general, the molecular weight of the polyphenylene ether resins can be controlled by controlling the reaction time, the reaction temperature and the amount of catalyst. Long reaction times provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like and the product is separated from the catalyst by filtration, precipitation or other suitable means as taught by Hay in U.S. Pat. No. 3,306,875. The ultra low intrinsic viscosity PPE of Component B resin may be recovered from the reaction solution used in the synthesis of higher molecular weight resins after the higher molecular weight resins have been separated.

It is preferable to employ ultra low I.V. PPE resin that is not recovered from a reaction solution by precipitation in a non-solvent. The solids recovered by these techniques are too fine and light, i.e. have an unacceptably low bulk density, to properly feed into processing equipment. It is preferable to employ ultra low I.V. PPE resin that is recovered from the reaction solution as a solid mass or in the form of an agglomerate having a size of at least 100 μm; preferably of a size greater than 1 mm. Agglomerates can be formed by spray drying the reaction solution. The ultra low I.V. PPE resin can be recovered as a solid mass in conventional equipment where the solvent is stripped off at elevated temperatures. This can be accomplished in conventional vented extruders, or vacuum/vented extruders, as such described in U.S. Pat. No. 5,204,410, or film evaporators, such as described in U.S. Pat. Nos. 5,419,810 and 5,256,250. The reaction solution may be concentrated as described in U.S. Pat. No. 4,692,482 to facilitate the removal of solvent performed by this equipment and minimize the exposure of the ultra low viscosity PPE resin to thermal stress. Forming a solid mass enables the ultra low viscosity PPE to be pelletized to a conventional pellet size of about 3 mm or any desired size. The ultra low I.V. PPE is preferably of a conventional pellet size so that it can be easily handled in feed hoppers for the equipment used to form the PPE blend with the higher viscosity PPE resins in Component A. Preferably, this is accomplished with minimal thermal stress so that the formation of impurities is not a problem. The ultra low I.V. PPE preferably contains fewer than 0.001% (1000 ppm) impurities.

The weight ratio of Component A to Component B in the PPE blends of this invention can vary widely and is preferably greater than 1:1 and more preferably greater than 1.25:1 to provide a useful balance of physical properties. Weight ratios in the range of 5:1 to 20:1 are even more preferred and ratios in the range of 5:1 to 10:1 are most preferred when trying to increase the flow properties of the Component A resin while minimizing the loss in HDT values and flame retardancy. At high concentrations, the ultra low I.V. PPE resin provides brittle materials. Therefore, the ultra low I.V. PPE resin is preferably used in an amount of 30 wt % or less of the total composition, more preferably from 1 to 20 wt % of the total composition and most preferably from 3 to 15 wt % of the total composition.

The PPE resin blend of this invention can be mixed with other components in amounts that vary widely. Most often the PPE resin blend is employed in an amount in the range of about 5 to 95% by weight with additives and other resins making up the difference. However, this invention includes compositions which comprise 100% of the PPE resin blend. Other components that can be added to the PPE blends include conventional additives and resins which are conventionally added to PPE formulations.

In certain embodiments, the various resins which may be blended with the PPE resin compositions of this invention include vinyl aromatic resins, polyamides as disclosed in U.S. Pat. Nos. 5,981,656 and 5,859,130, polyarylene sulfides as disclosed in U.S. Pat. No. 5,290,881, polyphthalamides as disclosed in U.S. Pat. No. 5,916,970, polyetheramides as disclosed in U.S. Pat. No. 5,231,146 and polyesters as disclosed in U.S. Pat. No. 5,237,005.

The vinyl aromatic resins that may be added to the PPE blends of this invention comprise polymers that contain at least 25% by weight of structural units derived from a monomer of the formula:

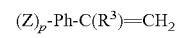

$(Z)_p\text{-Ph-C}(R^3)\!\!=\!\!CH_2$ wherein Ph is phenyl, $R^3$ is hydrogen, lower alkyl or halogen, Z is vinyl, halogen or lower alkyl and p is 0 to 5. These vinyl aromatic polymers include homopolystyrene, polychlorostyrene, polyvinyltoluene, and rubber modified polystyrene (sometimes referred to as "HIPS") comprising blends and grafts with elastomeric polymers, as well as mixtures of these materials. Styrene-containing copolymers such as styrene-acrylonitrile copolymers (SAN), styrene-maleic anhydride copolymers, polyalpha-methylstyrene and copolymers of ethylvinylbenzene, divinylbenzene are also suitable.

The vinyl aromatic polymers are prepared by methods well recognized in the art including bulk, suspension and emulsion polymerization. The amount of vinyl aromatic resin added to the PPE blends of this invention depends on the properties contemplated and typically ranges from about 5% to 90% by weight, preferably from about 15% to about 60% by weight, based on the weight of the total composition.

Examples of suitable polystyrene resins are generally known in the art and are described for example in Chapter 3 of Organic Polymer Chemistry, $2^{nd}$ edition K. G. Saunders, Chapman and Hall, 1988 and in U.S. Pat. No. 4,816,510, issued to John B. Yates III.

The use of various additives which may impart a variety of attributes to the PPE resin blend of this invention is also within the scope of this invention. Most additives are well known in the art as are their effective levels and methods of incorporation. Examples of such additives are impact modifiers, flame retardants, plasticizers, antioxidants, fillers, conductive fillers (e.g., conductive carbon black, carbon fibers, stainless steel fibers, metal flakes, metal powders, and the like) reinforcing agents, (e.g., glass fibers), stabilizers (e.g., oxidative, thermal and ultraviolet stabilizers), antistatic agents, lubricants, colorants, dyes, pigments, drip retardants, flow modifiers and other processing aids.

Materials which enhance the impact strength of the PPE resin blends of this invention are not critical but are often desirable. Suitable materials include natural and synthetic elastomeric polymers such as natural rubbers, synthetic rubbers and thermoplastic elastomers. They are typically derived from monomers such as olefins (e.g., ethylene, propylene, 1-butene, 4-methyl-1-pentene) alkenylaromatic monomers, (e.g., styrene and alphamethyl styrene) conjugated dienes (e.g., butadiene, isoprene and chloroprene) and vinylcarboxylic acids and their derivatives (e.g., vinylacetate, acrylic acid, alkylacrylic acid, ethylacrylate, methyl methacrylate acrylonitrile). They may be homopolymers as well as copolymers including random, block, graft and core shell copolymers derived from these various suitable monomers discussed more particularly below.

Polyolefins which can be included within the PPE resin blends of this invention are of the general structure: $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790, 519, 3,884,993, 3,894,999, 4,059,654, 4,166,055 and 4,584, 334.

Copolymers of polyolefins may also be used such as copolymers of ethylene and alpha olefins like propylene and 4-methylpentene-1. Copolymers of ethylene and $C_3$–$C_{10}$ monoolefins and non-conjugated dienes, herein referred to as EPDM copolymers, are also suitable. Examples of suitable $C_3$–$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Mole ratios of ethylene to other $C_3$–$C_{10}$ monoolefin monomers can range from 95:5 to 5:95 with diene units being present in the amount of from 0.1 to 10 mol %. EPDM copolymers can be functionalized with an acyl group or electrophilic group for grafting onto the polyphenylene ether as disclosed in U.S. Pat. No. 5,258,455.

Polyolefins are typically present in an amount from about 0.1% to about 10% by weight based on the total weight of the composition. Where the polyolefin is an EPDM, the amount is generally from 0.25% by weight to about 3% by weight of the composition.

Suitable materials for impact modification include conjugated diene homopolymers and random copolymers. Examples include polybutadiene, butadiene-styrene copolymers, butadiene-acrylate copolymers, isoprene-isobutene copolymers, chlorobutadiene polymers, butadiene acrylonitrile polymers and polyisoprene. These impact modifiers may comprise from about 1 to 30 weight percent of the total composition.

A particularly useful class of impact modifiers with conjugated dienes comprises the AB (di-block), $(AB)_m$-R (di-block) and ABA' (tri-block) block copolymers. Blocks A and A' are typically alkenyl aromatic units and Block B is typically conjugated diene units. For block copolymers of the formula $(AB)_m$-R, integer m is at least 2 and R is a multifunctional coupling agent for the blocks of the structure AB.

Also useful are core shell graft copolymers of alkenylaromatic and conjugated diene compounds. Especially suitable are those comprising styrene blocks and butadiene, isoprene or ethylene-butylene blocks. Suitable conjugated diene blocks include the homopolymers and copolymers described above which may be partially or entirely hydrogenated by known methods, whereupon they may be represented as ethylene-propylene blocks or the like and have properties similar to those of olefin block copolymers. The suitable alkenyl aromatics include styrene, alpha-methyl styrene, para-methyl styrene, vinyl toluene, vinyl xylene and vinyl naphthalene. The block copolymer preferably contains from about 15 to 50% alkenyl aromatic units. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS) and poly(alpha-methylstyrene)-polyisoprene-poly(alpha-methylstyrene). Examples of commercially available triblock copolymers are the CARIFLEX®, KRATON® D and KRATON® G series from Shell Chemical Company.

Also included are impact modifiers comprising a radial block copolymer of a vinyl aromatic monomer and a conjugated diene monomer. Copolymers of this type generally comprise about 60 to 95 wt % polymerized vinyl aromatic monomer and about 40 to 5 wt % polymerized conjugated diene monomer. The copolymer has at least three polymer chains which form a radial configuration. Each chain terminates in a substantially non-elastic segment, to which the elastic polymer segment is joined. These block copolymers are sometimes referred to as "branched" polymers as described in U.S. Pat. No. 4,097,550 and are used in amounts analogous to other conjugated diene based impact modifiers.

The polyphenylene ether resin blends of this invention can be rendered flame retardant with the use of flame retardant additives known in the art including halosubstituted diaromatic compounds such as 2,2-bis-(3,5-dichlorophenyl) propane, as described in U.S. Pat. No. 5,461,096 and phosphorous compounds as described in U.S. Pat. No. 5,461,096. Other examples of halosubstituted diaromatic flame retardant additives include brominated benzene, chlorinated biphenyl, brominated polystyrene, chlorine containing aromatic polycarbonates or compounds comprising two phenyl radicals separated by a divalent alkenyl group and having at least two chlorine or two bromine atoms per phenyl nucleus, and mixtures thereof.

The preferred flame retardant compounds employed in the compositions of the present invention are free of halogen. These preferred compounds include phosphorous compounds selected from elemental phosphorous, organic phosphonic acids, phosphonates, phosphinates, phosphinites, phosphine oxides such as triphenylphosphine oxide, phosphines, phosphites and phosphates. Typical of the preferred phosphorous compounds are those of the general formula: $O=P$—$(OZ)_3$ and nitrogen analogs of these phosphorous compounds. Each Z represents the same or different radicals including hydrocarbon radicals such as alkyl, cycloalkyl, aryl, alkyl substituted aryl and aryl substituted alkyl; halogen, hydrogen, and combinations thereof provided that at least one of said Qs is aryl. More preferred are phosphates wherein each Q is aryl. Other suitable phosphates include diphosphates and polyphosphates having the following formulae

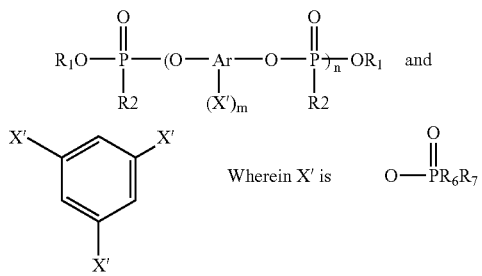

where Ar is phenyl, biphenyl with a lower alkyl bridge or triphenyl, each $R_1$ is independently hydrocarbon; $R_2$, $R_6$ and $R_7$ are independently hydrocarbon or hydrocarbonoxy, each $X^1$ is either hydrogen methyl, methoxy or halogen, m is an integer of from 1 to 4; and n is an integer of from about 1 to 30. Preferably, each $R_1$ is independently phenyl or lower alkyl of from 1 to 6 carbon atoms and $R_2$, $R_6$ and $R_7$ are each independently phenyl, lower alkyl of 1 to 6 carbon atoms, phenoxy or (lower) alkoxy of from 1 to 6 carbon atoms.

Examples of suitable phosphates include phenylbisdodecyl phosphate, phenylbisneopentyl phosphate, phenylethylene hydrogen phosphate, phenyl-bis-3,5,5'-trimethylhexyl phosphate, ethydiphenyl phosphate, 2-ethylhexyl di(p-tolyl), phosphate, diphenyl hydrogen phosphate, bis(2-ethylhexyl) p-tolylphosphate, tritolyl phosphate, bis(2-ethylhexyl)-phenyl phosphate, tri(nonylphenyl) phosphate, phenyl-methyl hydrogen phosphate, di(dodecyl) p-tolyl phosphate, tricresyl phosphate, triphenyl phosphate, isopropylated triphenyl phosphate, halogenated triphenyl phosphate, dibutylphenyl phosphate, 2-chlorethyldiphenyl phosphate, p-tolyl bis(2,5,5'-trimethylhexyl) phosphate, 2-ethylhexyldiphenyl phosphate and the like.

The most preferred phosphates are triphenyl phosphate, the alkylated triphenyl phosphates, including isopropylated and butylated triphenyl phosphates, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds.

Suitable compounds containing a phosphorus-nitrogen bond include phosphonitrilic chloride, phosphorus ester amides, phosphoric acid amides, phosphonic acid amides, and phosphinic acid amides. Bis-phosphoramide materials derived from piperazine and hydroxyaromatic compounds are especially useful.

The level of flame retardant added to the PPE resin blends of this invention can range from 0.5 to 30 wt %. A preferred level for the phosphorous flame retardants is from 7% to 20% by weight of the composition. In some embodiments it is preferable to use the phoshorous flame retardants such as triphenyl phosphate in combination with other flame retardants such as hexabromobenzene and optionally antimony oxide.

Suitable phosphorous flame retardant additives are commercially available and methods for preparing the phosphate flame retardants are generally known in the art. As an example, the compounds may be prepared by reacting a halogenated phosphate compound with various dihydric or trihydric phenolic compounds until the desired number of phosphate functional groups are obtained. Examples of the phenolic compounds are dihydroxy aromatic compounds such as resorcinol and hydroquinone.

It has been found that the advantages of employing ultra low I.V. polyphenylene ether resins as discussed above are also provided in fiber reinforced PPE resin blends although fiber reinforced resins typically require higher levels of flame retardant as compared to unfilled resins. As reinforcing agents, the PPE resin blends of the present invention may contain fiber reinforcement such as glass fibers which greatly increases the flexural strength and modulus as well as the tensile strength of the molded composition obtained therewith. In general, lime-aluminum borosilicate glass that is relatively soda-free ("E" glass) is preferred. Although glass roving may be used, cut fibers are often preferred. The length of such fibers is usually at least 3 mm and a preferred length is in the range of 3 mm to 13 mm. A preferred diameter of the fibers is in the range of about 0.002 mm to about 0.015 mm (i.e. 15 μm). The amount of glass fiber employed can range from 0 to 60% by weight of the total composition and is preferably in the range of about 3% to 30% by weight based on the weight of the entire composition. Larger amounts are used where the end use requires a higher degree of stiffness and strength. More preferably, the amount of glass fiber ranges from about 6% to 25% by weight. Carbon fibers, carbon fibrils, Kevlar® fibers, stainless steel fibers, and metal coated graphite fibers can also be employed at levels of 0 to 60 wt %, preferably in the range of 3 to 25 wt %, more preferably in the range of 7% to 10% by weight. Carbon fibers typically have a length of at least 3 mm, preferably from 3 mm to 13 mm. Samples of metal used to coat the graphite fibers include nickel, silver, brass, copper and gold, with nickel being preferred. Fibers and platelets of metals such as aluminum, nickel, iron and bronze are also suitable in amounts up to 60 wt %.

Suitable non-fiberous inorganic fillers include mica, clay, glass beads, glass flakes, graphite, aluminum hydrate, calcium carbonate, silica, kaolin, barium sulfate, talcum and calcium silicate (Wollastonite). Effective amounts will differ according to the particular agent used, but they are generally in the range of 0.25% to 60 wt %, more typically from 1 to 30 wt % and preferably from 3% to 12% by weight based on the weight of the entire composition. Examples of mica include muscovite, phlogopite, biotite, fluorophlogopite, and synthetic mica. When utilized, the levels of mica are preferably in the range of 0.25% to 30% by weight, based on the weight of the entire composition. When utilized, the preferred amounts of clay range from 0.25% to 30% by weight, based on the weight of the entire composition.

Suitable pigments include those well known in the art such as $TiO_2$, and carbon black. Suitable stabilizers include zinc sulfide, zinc oxide and magnesium oxide.

While the PPE resin blend preferably is of a reduced viscosity and increased flow, it is contemplated that conventional flow promoters and plasticizers may still be desired for certain embodiments. Examples of suitable flow promoters and plasticizers include the phosphate plasticizers such as cresyl diphenyl phosphate, triphenyl phosphate, tricresyl phosphate, isopropylated and triphenyl phosphate. Terepene phenol, saturated alycyclic hydrocarbons, chlorinated biphenols and mineral oil are also suitable. When used, the plasticizers are typically employed in an amount of 1–10 wt % based on the weight of the composition.

Suitable antioxidants include hydroxylamines, hindered phenols such as alkylated monophenols and polyphenols, benzofuranones such as 3 aryl benzolfuranone, alkyl and aryl phosphites such as 2,4-di-tert butyl phenol phosphite and tridecyl phosphite, and hindered amines such as dioctyl methylamine oxide and other tertiary amine oxides. Such antioxidants are preferably used in an amount of 0.1 to 1.5 wt %, based on the weight of the composition.

Suitable U.V. stabilizers include 4,6-dibenzoyl resorcinols, alkanol amine morphulenes and benzotriazole.

The PPE resin blends and compositions which contain them may be prepared by well known procedures. An example of a method of preparation is to first dry blend Components A and B and compound the mixture by known techniques such as within an extruder to form the blend of polyphenylene ether resins. The resulting blend has lower viscosity (and increased flow) compared to the PPE resin of Component A while giving higher HDT values, impact properties and flammability compared to previously known high flow modified polyphenylene ether formulations. This PPE resin blend can be blended with other components or extruded, quenched and chopped into pellets. These pellets can then be melted and molded into articles of desired shape and size or compounded again to blend with other components before additional processing in preparing finished articles.

Without further elaboration, it is believed that one skilled in the art can, using the preceding description, utilize the present invention to its fullest extent. The entire disclosure of all patents and publications cited above, are herein incorporated by reference.

EXAMPLES

Example I and Comparative Examples 1 and 2

A polyphenylene ether formulation was prepared with 10 parts PPO® SA120 polyphenylene ether resin (I.V.=0.12 dl/g as measured in chloroform at 25° C.), available from G. E. Plastics as Example 1. The polyphenylene ether resin was poly (2,6-dimethyl-1,4-phenylene) ether in pelletized form of an average size of about ⅛" (3 mm) after recovery from a reaction solution with a vented extruder.

Two polyphenylene ether formulations were also prepared with 10 parts of conventional flow promoters as Comparative Examples 1 and 2. Comparative Example 1 contained 10 parts of Arkon P125 saturated alicyclic hydrocarbon flow modifier available for Arawaka Chemical Industries Ltd. and Comparative Example 2 contained 10 parts of Nirez 2150/7042 terpene phenol flow modifier available from Arizona Chemical Company.

Each formulation contained 62.25 parts of PPO® polyphenylene ether available from GE Plastics, which was poly(2,6-dimethyl-1,4-phenylene) ether having an intrinsic viscosity of about 0.40 dl/g, as measured in chloroform at 25° C. Each formulation also contained bisphenol-A diphosphate flame retardant (12 parts), available from AKZO Nobel Chemical Inc., tris-(2,4-dibutylphenyl) phosphite stabilizer (0.3 parts), available from Argus Chemical and Witco, K-filament glass fiber reinforcement (4 mm long, 14 micron diameter, sized with silane coupling agent and urethane film former, 10 parts), available from Owens Corning, clay (5 parts), MgO (0.3 parts), ZnS (0.15 parts) and carbon black (0.5 parts).

The formulations were compounded in a 30 mm Werner and Pfleiderer co-rotating twin screw extruder. The extruder has a primary melting and mixing section for melting and mixing resins with each other and a secondary (downstream) mixing section for distributive mixing of glass fibers. For the experiments described in this example, the extruder was operated at a temperature of 550° F. (288° C.), and a speed of about 350 rpm.

The extrudate was quenched in water and pelletized. The pellets were then injection molded using a Van Dorn Demag 120 ton injection molding machine (melt temperature 560° F. (290° C.) mold temperature 190° F. (88° C.)) into various specimens (test bars) for UL94 flame out tests and ASTM-D 256, D648 and D638 tests. The results of these tests, as well as other physical and mechanical properties of the formulations, are reported in Table 1. Details of the test procedures follow Tables 1 and 2. Intrinsic viscosity was measured using a Brookfield Viscometer. Shear viscosity was measured using a Kayeness capillary rheometer.

TABLE 1

| Example # | Units | 1 | Comp 1 | Comp 2 |
|---|---|---|---|---|
| Blend Components | | | | |
| 0.40 IV PPE[1] | | 62.25 | 62.25 | 62.25 |
| Ultra-low IV PPE resin[2] | | 10 | | |
| Arkon P-125[3] | | | 10 | |
| Nirez 2150/7042[4] | | | | 10 |
| BPA-DP FR[5] | | 12 | 12 | 12 |
| OCF R22Y K-filament glass fibers[6] | | 10 | 10 | 10 |
| Huber Clay 90[7] | | 5 | 5 | 5 |
| Phosphite 168 Stabilizer[8] | | 0.3 | 0.3 | 0.3 |
| MgO | | 0.3 | 0.3 | 0.3 |
| ZnS | | 0.15 | 0.15 | 0.15 |
| Carbon Black | | 0.5 | 0.5 | 0.5 |
| Total | | 100.5 | 100.5 | 100.5 |
| HDT @ 264 psi ¼", ASTM D648 | F | 283.4 | 270.5 | 277.5 |
| Noth. Izod @ 73 F ⅛", 2 ft lb Hammer, ASTM D256 | Ft lb/in | 0.41 | 0.44 | 0.39 |
| UnNotch. Izod, 73 F ⅛", 2 ft lb Hammer, ASTM D256 | Ft lb/in | 4.6 | 3.9 | 3.0 |
| Tens. Break Str. (0.2 in/min), ASTM D638 | Psi | 13718 | 11693 | 14445 |
| Tens. Elong @ break, ASTM D638 | % | 2.45 | 2.27 | 2.27 |
| t1: Total Flame-Out Time, 1st Flame Application[1,2] | Sec | 24 | 35 | 56 |
| t2: Total Flame-Out Time, 2nd Flame Application[9,10] | Sec | 40 | 95 | 60 |
| t1 + t2 | Sec | 64 | 130 | 116 |
| Average Flame-Out Time | Sec | 1.6 | 3.3 | 2.9 |
| Standard Deviation (Flame-Out Time) | Sec | 0.8 | 4.5 | 3.6 |
| Probability of passing UL94 V0 Rating on 1st submittal of 5 flame bars | | 0.998 | 0.586 | 0.834 |
| Shear Viscosity at 300 C, 1500 S⁻¹ Shear Rate | Pa Sec | 149 | 159 | 155 |
| Shear Viscosity at 300 C, 2500 S⁻¹ Shear Rate | Pa Sec | 116 | 125 | 118 |
| Shear Viscosity at 300 C, 3000 S⁻¹ Shear Rate | Pa Sec | 107 | 114 | 107 |

[1]PPO ® Polyphenylene ether from GE Plastics
[2]PPO SA120 Polyphenylene ether (0.12 dl/g = I.V.) from GE Plastics
[3]Arkon P-125 saturated alicyclic hydrocarbon (MW = 750) from Arawaka Chemical Industries
[4]Nirez 2150/7042 terpene phenol from Arizona Chemical Co.
[5]Bisphenol A diphosphate flame retardant available from Akzo Nobel Chemical Inc.
[6]K-filament glass fibers from Owens-Corning
[7]Available from J. M. Huber Corporation
[8]Available from various suppliers including: Argus Chemical, Wilco, Great Lakes Chemical
[1]20 flame bars (1.5 mm thick) were tested for each material
[2]Flame testing was conducted as per the UL94 Vertical Burn protocol Test data in Table 1 indicate that the use of ultra low I.V. polyphenylene ether resin in place of saturated alicyclic hydrocarbon or terpene phenol flow promoters resulted in higher HDT values and a reduction in flame out time with comparable shear viscosity values. Therefore, formulations with ultra low IV polyphenylene ether will allow for reduced loadings of flame retardant while providing higher heat and equivalent flow performance. Additionally, during the compounding operation of the materials, sample 1 made with a low molecular weight PPE in a pelletized form exhibited no feeding difficulties nor unstable operation of the compounding extruder as is typically observed for the compositions of Haaf that utilized a conventionally non-solvent precipitated PPE.

Examples 2–4

Polyphenylene ether formulations were prepared with 7.5, 10 and 30 parts of PPO® SA120 (I.V.=0.12) polyphenylene ether resin per 100.5 parts of total formulation. The PPO SA120 described in Example 1 was used here as well. A polyphenylene ether resin having an intrinsic viscosity of 0.40 as defined in Example 1 was employed in an amount adjusted so that the total amount of polyphenylene ether resin within the formulation was 72.25 parts. The formulations were compounded and molded into test specimens and tested for flammability, HDT values and impact properties consistent with the procedures set forth in Example 1. The results of these test and other physical properties are reported in Table 2.

TABLE 2

| Example # | | 2 | 3 | 4 |
|---|---|---|---|---|
| RM Description | Units | | | |
| 0.40 IV PPE[1] | | 64.75 | 62.25 | 42.25 |
| Ultra-low IV PPE resin[2] | | 7.5 | 10 | 30 |
| BPA-DP FR[3] | | 12 | 12 | 12 |
| OCF R22Y K-filament glass fibers[4] | | 10 | 10 | 10 |
| Huber Clay 90[5] | | 5 | 5 | 5 |
| Phosphite 168 Stabilizer[6] | | 0.3 | 0.3 | 0.3 |
| MgO | | 0.3 | 0.3 | 0.3 |
| ZnS | | 0.15 | 0.15 | 0.15 |
| Carbon Black | | 0.5 | 0.5 | 0.5 |
| Total | | 100.5 | 100.5 | 100.5 |
| HDT @ 264 psi ¼", ASTM D648 | F | 290.3 | 283.4 | 277.9 |
| Noth. Izod @ 73 F ⅛", 2 ft lb Hammer, ASTM D256 | Ft lb/in | 0.46 | 0.41 | 0.34 |
| UnNotch. Izod, 73 F ⅛", 2 ft lb Hammer, ASTM D256 | FT lb/in | 5.3 | 4.6 | 1.2 |
| Tens. Break Str. (0.2 in/min), ASTM D638 | Psi | 14190 | 13718 | 7753 |
| Tens. Elong @ break, ASTM D638 | % | 2.56 | 2.45 | 0.95 |
| t1: Total Flame-Out Time, 1st Flame Application[7,8] | Sec | 24 | 24 | 26 |
| t2: Total Flame-Out Time, 2nd Flame Application[7,8] | Sec | 41 | 40 | 56 |
| t1 + t2 | Sec | 65 | 64 | 82 |
| Average Flame-Out Time | Sec | 1.6 | 1.6 | 2.1 |
| Standard Deviation (Flame-Out Time) | Sec | 0.9 | 0.8 | 1.5 |
| Probability of passing UL94 V0 Rating on 1st submittal of 5 flame bars | | 0.999 | 0.998 | 0.961 |
| Shear Viscosity at 300 C, 1500 S$^{-1}$ Shear Rate | PaSec | 211 | 149 | 82 |
| Shear Viscosity at 300 C, 2500 S$^{-1}$ Shear Rate | PaSec | 159 | 116 | 63 |
| Shear Viscosity at 300 C, 3000 S$^{-1}$ Shear Rate | PaSec | 144 | 107 | 57 |

[1]PPO ® Polyphenylene ether from GE Plastics
[2]PPO SA120 Polyphenylene ether (I.V. = 0.12 dl/g) from GE Plastics
[3]Bisphenol A diphosphate available from Akzo Nobel Chemical Inc.
[4]K-filament glass from Owens Corning
[5]Available from J.M. Huber Corporation
[6]Available from various suppliers including: Argus Chemical, Witco, Great Lakes Chemical
[7]20 flame bars (1.5 mm thick) were tested for each material
[8]Flame testing was conducted as per the UL94 Vertical Burn protocol The data from Examples 2–4 show that formulations prepared using high loadings of ultra low IV polyphenylene ether resin continue to improve flow and maintain UL94 VO performance. However, impact properties decrease, as shown by the unnotched izod test. The ductility of the samples also decreases as demonstrated by low tensile elongation values for Example 4. Moreover the formulation reported in Example 4 exhibited poor melt strength as evidenced by difficulty in pulling the extrudate through a water cooling bath.

Experimental

Tests for flame retardancy were performed according to UL-94 protocol for a VO rating using 20 test bars of the polyphenylene ether formulations with the dimensions: 5"×½"×1.5 mm.

The compositions made in the above examples were tested for flammability using a flame retardant testing tool which provides a prediction of the likelihood that a particular UL standard, such as UL-94 will be passed. The UL-94 protocol calls for bar-shaped specimens of dimensions 5"(12.7 cm)×½" (1.3 cm) width×the desired normal thickness, UL-94 ratings being specified for a particular thickness. A flame having an inner cone of height ¾" (1.9 cm) is applied to each specimen so that a distance of ⅜" (1.0 cm) separates the lower end of the specimen from base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed below.

| Vertical Flame Class Requirements | | | |
|---|---|---|---|
| | 94V-0 | 94V-1 | 94V-2 |
| Individual burn time (seconds) | ≤10 | ≤30 | ≤30 |
| Total burn time (seconds) (5 specimens) | ≤50 | ≤250 | ≤250 |
| Glowing time (seconds) (individual specimen) | ≤30 | ≤60 | ≤60 |
| Drip particles that ignite cotton | NO | NO | YES |

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed.

For a V-1 rating, no individual burn times, from the first or second application may exceed 30 seconds. The total of the burn times for any five specimens may not exceed 250 seconds. Drip particles that ignite a piece of cotton gauze situated below the specimen are not allowed.

For a V-2 rating, no individual burn times, from the first or second application may exceed 30 seconds. The total of the burn times for any five specimens may not exceed 250 seconds. Drip particles that ignite a piece of cotton gauze situated below the specimen are allowed.

A statistical analysis of the data obtained from a flame test can be applied to determine the probability of at least one possible outcome of the test. Possible outcomes include a first submittal pass, including first time pass and retest, and a second submittal pass, including first time pass and retest, and failure. The probability of at least one outcome, preferably a first time pass on a first submission, provides a measure of the flame retardance of the polymer composition, while minimizing the variability inherent in flame testing, particularly the UL-94 test.

The raw data may be transformed prior to use in the statistical calculations by conversion to equivalent logarithmic values. ("Logarithm" and "logarithmic" refer to base 10 logarithms.) Times less than one second may be rounded up to one second in order to avoid negative logarithmic values. The logarithm of the burn time may then be calculated and used in subsequent steps. Use of transformed data is preferred as a more normal distribution of values associated with burn time is thereby provided. Raw data do not show a normal (bell-shaped) distribution curve because there can be no values less than zero, and data points are typically clustered in the space below the maximum individual burn time. The transformed data, however, more closely fit a normal distribution curve.

The probability of a first time pass may be determined according to the formula:

$$P_{first\ time\ pass} = (P_{t1>mbt,\ n=0} \times P_{t2>mbt,\ n=0} \times P_{total<mtbt} \times P_{drip,\ n=0})|$$

wherein $P_{t1>mbt,\ n=0}$ is the probability that no first burn time exceeds a maximum burn time value, $P_{t2>mbt,n=0}$ is the probability that no second burn time exceeds a maximum burn time value, $P_{total<=mtbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula:

$$P_{t1>mbt,\ n=0} = (1-P_{t1>mbt})^5$$

wherein $P_{t1>mbt}$ is the area under the log normal distribution curve for t1>mbt and where the exponent "5" relates to the number of bars tested.

The probability that a single second burn time exceeds a maximum burn time value may be determined from the formula:

$$P_{t2>mbt,\ n=0} = (1-P_{t2>mbt})^5 |$$

wherein $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating, the maximum burn time is 30 seconds.

The probability $P_{drip,\ n=0}$ that no specimen exhibits dripping during the flame test is an attribute function, estimated by:

$$(1-P_{drip})^5$$

wherein $P_{drip}$=the number of bars that drip/the number of bars tested.

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total <=maximum total burn time. For the UL-94 V-0 rating, the maximum total burn time is 50 seconds. For a V-1 or V-2 rating, the maximum total burn time is 250 seconds.

The probability of a retest is determined according to the following formula:

$$P_{retest} = (P_{t1>mbt,\ n=1} \times P_{t2>mbt,\ n=0} \times P_{total<=mtbt} \times P_{drip,\ n=0}) + (P_{t1>mbt,\ n=0} \times P_{t2>mbt,\ n=1} \times P_{total<=mtbt} \times P_{drip,\ n=0}) + (P_{t1>mbt,\ n=0} \times P_{t2>mbt,\ n=0} \times P_{mtbt} \times P_{drip,\ n=0}) + (P_{t1>mbt,\ n=0} \times P_{t2>mbt,\ n=0} \times P_{total>=mtbt} \times P_{drip,\ n=1})|$$

wherein $P_{t1>mbt,\ n=1}$ is the probability that a single first burn time exceeds a maximum burn time value, $P_{t2>mbt,\ n=1}$ is the probability that a single second burn time exceeds a maximum burn time value, $P_{mtbt<total<=mrtbt}$ is the probability that the sum of individual burn times is greater than the maximum total burn time value and is less than or equal to the maximum retest total burn time value, $P_{drip,\ n=1}$ is the probability that a single specimen exhibits dripping during the flame test and $P_{t1>mbt,\ n=0}$, $P_{t2>mbt,\ n=0}$, $P_{total<mtbt}$, and $P_{drip,\ n=0}$, are as defined above.

The probability that a single first burn time exceeds a maximum burn time value may be determined from the formula:

$$P_{t1>mbt,\ n=1} = 5 \times P_{t1>mbt} \times (1-P_{t1>mbt})^4 |$$

wherein $P_{t1>mbt}$ is defined as above.

The probability that a single second burn time exceeds a maximum burn time value may be determined from the formula:

$$P_{t2>mbt,\ n=1} = 5 \times P_{t2>mbt} \times (1-P_{t2>mbt})^4 |$$

where $P_{t2>mbt}$ is defined above.

The probability that the sum of individual burn times is greater than the maximum total burn time value and is less than or equal to the maximum retest total burn time value may be determined from the normal distribution curve of simulated 5-bar total times, as described above for $P_{total<=mtbt}$. $P_{mtbt<total<=mrtbt}$ is equal to the area under a log normal distribution curve of a set of 1000 Monte Carlo simulated 5-bar total burn time for maximum total burn time<total<=the maximum retest total burn time value. For the UL-94 V-0 rating, the maximum total burn time is 50 seconds, and the maximum retest total burn time value is 55 seconds. For a V-1 or V-2 rating, the maximum total burn time is 250 seconds, and the maximum retest total burn time value is 255.

The probability that a single specimen exhibits dripping during the flame test may be estimated from the following attribute function:

$$P_{drip,\ n=1} = 5 \times P_{drip} \times (1-P_{drip})^4|$$

wherein $P_{drip}$ is defined as for a first time pass, above.

By definition, the sum of the probabilities of possible outcomes of a first submittal is one:

$$\Sigma\ \text{Probabilities} = P_{first\ time\ pass} + P_{retest} + P_{failure,\ no\ retest} = 1.|$$

Therefore, the probability of a failure is given by:

$$P_{failure,\ no\ retest} = 1 - P_{first\ time\ pass} - P_{retest}$$

The probability of a first submittal pass is given by:

$$P_{1st\ submittal\ pass} = P_{first\ time\ pass} + P_{retest} \times P_{first\ time\ pass}$$

wherein $P_{first\ time\ pass}$ and $P_{retest}$ are as defined above.

The probability of a second submittal pass is determined according to:

$$P_{2nd\ submittal\ pass} = P_{failure,\ no\ retest} \times (P_{first\ time\ pass} + P_{retest} \times P_{first\ time\ pass})|$$

wherein $P_{first\ time\ pass}$, $P_{retest}$ and $P_{failure,\ no\ retest}$ are as defined above.

Finally, the probability of a pass after a first and second submittal, or the overall probability of a pass is:

$$P_{overall\ pass} = P_{1st\ submittal\ pass} + P_{2nd\ submittal\ pass}$$

Heat distortion temperatures were determined by a test procedure based on ASTM D648. The values reported in Tables 1 and 2 are an average of three measured values.

Notched Izod and unnotched Izod tests were performed by a test procedure based on ASTM D256. The results of the test are reported in terms of energy absorbed per unit of specimen width and expressed as foot times pounds per inch (ft.lbs/in.). The test results reported in the tables are an average of 5 test specimens.

Tensile strength was determined by a test procedure based on ASTM D638 with an MTS instrument (Mitsubishi). The test bars in the form of standard dumb bells shapes are employed in this test. The results reported in the tables are an average of five test specimens. Tensile strength was calculated by dividing the maximum load observed in the test by the original minimum cross-sectional area of the test specimen. The results are expressed in pounds per square inch (psi). An extensiometer was used to measure tensile elongation values.

Shear viscosity was measured at each shear rate twice using a Kayeness capillary rheometer and averaged viscosities were reported in Tables 1 and 2.

The preceding examples can be repeated with similar success by substituting the generically or specifically described reactants and/or operating conditions of this invention for those used in these examples.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A composition comprising:
    a first polyphenylene ether resin having an intrinsic viscosity of at least about 0.3 dl/g as measured in chloroform at 25° C. prior to melt blending; and
    a second polyphenylene ether resin having an intrinsic viscosity less than or equal to 0.17 dl/g as measured in chloroform at 25° C. prior to melt blending wherein the second polyphenylene ether is isolated from a reaction solution as a solid mass or by agglomeration.

2. The composition of claim 1, further comprising a vinyl aromatic resin.

3. The composition of claim 1, further comprising a polyolefin.

4. The composition of claim 1, further comprising an impact modifier.

5. The composition of claim 1, further comprising a flame retardant.

6. The composition of claim 5, wherein the flame retardant is free of halogen.

7. The composition of claim 5, wherein the flame retardant is a phosphorous compound.

8. The composition of claim 7, wherein the flame retardant is selected from the group consisting of triphenyl phosphate, the alkylated triphenyl phosphates, isopropylated triphenyl phosphate, butylated triphenyl phosphate, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds.

9. The composition of claim 1, further comprising glass fiber in an amount up to 60% by weight of the total composition.

10. The composition of claim 1, further comprising carbon fiber in an amount up to 60% by weight of the total composition.

11. The composition of claim 1, further comprising a non-fiberous inorganic filler.

12. The composition of claim 1, wherein the composition has an HDT value greater than about 121° C. as determined by ASTM D648.

13. The composition of claim 1, wherein the composition exhibits a UL-94 VI rating or better.

14. A composition comprising:
    a first polyphenylene ether resin having an intrinsic viscosity of at least about 0.3 dl/g as measured in chloroform at 25° C. prior to melt blending;
    a second polyphenylene ether resin having an intrinsic viscosity less than or equal to 0.17 dl/g as measured in chloroform at 25° C. prior to melt blending wherein the second polyphenylene ether is isolated from a reaction solution as a solid mass or by agglomeration;
    glass fiber;
    flame retardant; and
    non-fiberous inorganic filler.

15. The composition of claim 14, wherein the glass fiber is present in an amount up to 60% by weight of the total composition.

16. The composition of claim 14, wherein the flame retardant is free of halogen.

17. The composition of claim 14, wherein the flame retardant is a phosphorous compound.

18. The composition of claim 17, wherein the flame retardant is selected from the group consisting of triphenyl phosphate, the alkylated triphenyl phosphates, isopropylated triphenyl phosphate, butylated triphenyl phosphate, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds.

19. The composition of claim 14, wherein the non-fiberous inorganic filler is selected from the group consisting of mica, clay, glass beads, glass flakes, graphite, aluminum hydrate, calcium carbonate, silica, kaolin, barium sulfate, talcum and calcium silicate.

20. A composition consisting essentially of:
a first polyphenylene ether resin having an intrinsic viscosity of at least about 0.3 dl/g as measured in chloroform at 25° C. prior to melt blending;
a second polyphenylene ether resin having an intrinsic viscosity less than or equal to 0.17 dl/g as measured in chloroform at 25° C. prior to melt blending wherein the second polyphenylene ether is isolated from a reaction solution as a solid mass or by agglomeration;
glass fiber;
flame retardant; and
non-fiberous inorganic filler.

21. The composition of claim 20, wherein the flame retardant is free of halogen.

22. The composition of claim 20, wherein the flame retardant is a phosphorous compound.

23. The composition of claim 20, wherein the flame retardant is selected from the group consisting of triphenyl phosphate, the alkylated triphenyl phosphates, isopropylated triphenyl phosphate, butylated triphenyl phosphate, bisneopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds.

24. The composition of claim 20, wherein the flame retardant is selected from the group consisting of tetraphenyl bisphenol-A diphosphate, tetraphenyl resorcinol diphosphate, bisphenol-A diphosphate, bisphenol-A polyphosphate, mixtures of these compounds and derivatives of these compounds.

* * * * *